United States Patent
Ji et al.

(10) Patent No.: US 11,718,896 B2
(45) Date of Patent: Aug. 8, 2023

(54) NANO-LANTHANUM OXIDE REINFORCED TUNGSTEN-BASED COMPOSITE MATERIAL AND PREPARATION METHOD THEREOF

(71) Applicant: Chongqing Institute of Green and Intelligent Technology, Chinese Academy of Sciences, Chongqing (CN)

(72) Inventors: Lina Ji, Chongqing (CN); Shenyu Wei, Chongqing (CN); Wenjie Wu, Chongqing (CN); Honglin Ma, Chongqing (CN)

(73) Assignee: Chongqing Institute of Green and Intelligent Technology, Chinese Academy of Sciences, Chongqing (CN)

( * ) Notice: Subject to any disclaimer, the term of this patent is extended or adjusted under 35 U.S.C. 154(b) by 18 days.

(21) Appl. No.: 17/810,171

(22) Filed: Jun. 30, 2022

(65) Prior Publication Data
US 2023/0101137 A1  Mar. 30, 2023

(30) Foreign Application Priority Data
Sep. 30, 2021 (CN) .......................... 202111159914.9

(51) Int. Cl.
| | |
|---|---|
| C22C 1/05 | (2023.01) |
| B33Y 10/00 | (2015.01) |
| B33Y 40/10 | (2020.01) |
| B33Y 70/10 | (2020.01) |
| B22F 10/36 | (2021.01) |
| B22F 10/34 | (2021.01) |
| B22F 10/28 | (2021.01) |
| B22F 10/366 | (2021.01) |
| B22F 9/04 | (2006.01) |
| C22C 27/04 | (2006.01) |

(52) U.S. Cl.
CPC .................. *C22C 1/05* (2013.01); *B22F 9/04* (2013.01); *B22F 10/28* (2021.01); *B22F 10/34* (2021.01); *B22F 10/36* (2021.01); *B22F 10/366* (2021.01); *B33Y 10/00* (2014.12); *B33Y 40/10* (2020.01); *B33Y 70/10* (2020.01); *C22C 27/04* (2013.01); *B22F 2009/043* (2013.01); *B22F 2301/20* (2013.01); *B22F 2302/25* (2013.01); *B22F 2304/10* (2013.01)

(58) Field of Classification Search
CPC ....................................................... C22C 1/05
See application file for complete search history.

(56) References Cited

U.S. PATENT DOCUMENTS

| | | | | |
|---|---|---|---|---|
| 5,604,321 A | * | 2/1997 | Patrician | ................... C22F 1/18 75/235 |
| 2017/0225234 A1 | * | 8/2017 | Fan | ........................... B22F 9/30 |
| 2022/0370690 A1 | * | 11/2022 | Yadov | ...................... C22C 27/00 |

FOREIGN PATENT DOCUMENTS

CN  110722171 A  *  1/2020

* cited by examiner

*Primary Examiner* — Christopher S Kessler
(74) *Attorney, Agent, or Firm* — Stanek Lemon Crouse & Meeks, P.A.

(57) ABSTRACT

The present disclosure discloses a nano-lanthanum oxide reinforced tungsten-based composite material and a preparation method thereof. A pure tungsten powder and a nano-lanthanum oxide powder are mixed to obtain a mixed powder, and in the mixed powder, the nano-lanthanum oxide powder accounts for 0.5-2% of the mixed powder by mass percent; and then, 3D printing forming is conducted on the mixed powder to obtain a bulk material of the nano-lanthanum oxide reinforced tungsten-based composite material. The nano-lanthanum oxide reinforced tungsten-based composite material of the present disclosure has excellent mechanical properties.

7 Claims, 4 Drawing Sheets

NANO-LANTHANUM OXIDE REINFORCED TUNGSTEN-BASED COMPOSITE MATERIAL AND PREPARATION METHOD THEREOF

CROSS REFERENCE TO RELATED APPLICATION

This patent application claims the benefit and priority of Chinese Patent Application No. 202111159914.9, filed on Sep. 30, 2021, the disclosure of which is incorporated by reference herein in its entirety as part of the present application.

TECHNICAL FIELD

The present disclosure relates to the technical field of 3D printing materials, and in particular to a nano-lanthanum oxide reinforced tungsten-based composite material and a preparation method thereof.

BACKGROUND

As a rare metal with high melting point and hardness, tungsten has been widely used in the fields of medical equipment and military projects. In addition, tungsten has great thermal conductivity, high neutron loading capacity, low sputtering yield, and can be used as plasma-facing materials and divertor in nuclear fusion facilities in the future. However, due to high hardness and brittleness, tungsten is difficult to be processed and formed. At present, main processing methods include a powder metallurgy method and a metal injection molding method. However, these traditional processing methods are complicated and have many restrictions on the shape and size of formed parts.

An additive manufacturing technology, also known as a 3D printing technology, is an emerging rapid prototyping technology. This technology has been rapidly developed in recent decades and mainly includes the following steps: first, constructing a three-dimensional model by using computer-aided design software, and planning a moving path of an energy source such as a laser and an electron beam; and then, bonding or melting a powder according to the planned path of the energy source, and conducting solidification, stacking layer by layer and accumulation to obtain a three-dimensional solid part. Compared with the traditional processing methods, the additive manufacturing technology mainly has the following advantages: (1) compared with traditional substractive manufacturing methods such as cutting and grinding, the additive manufacturing has a higher utilization rate of materials, and less waste or even zero waste can be achieved; (2) integrated forming can be achieved, and a greater design imagination space is provided for designers; and (3) forming processes are simple, a complex technological process is not required, and a result can be achieved in one step.

At present, a laser additive manufacturing process for metal materials such as titanium alloys, aluminum alloys, nickel alloys and stainless steels is relatively mature and has been widely used in the fields of aerospace, medical treatment and automobile manufacturing. However, due to physical properties of tungsten, a laser additive manufacturing process for tungsten materials still has certain difficulties. Since tungsten has a high ductile-brittle transition temperature of 180-400° C. and high thermal stress caused by a high-energy laser, a tungsten sample obtained after laser 3D printing is likely to have defects such as cracks, and as a result, mechanical properties of the sample are affected.

SUMMARY

In view of the shortcomings of the technologies above, the present disclosure aims to provide a nano-lanthanum oxide reinforced tungsten-based composite material and a preparation method thereof. Defects, such as cracks, of a tungsten sample formed after 3D printing can be effectively reduced, and mechanical properties of the tungsten sample can be improved.

In order to solve the technical problems above, the present disclosure adopts the following technical solutions.

One technical solution of the present disclosure is to provide a nano-lanthanum oxide reinforced tungsten-based composite material. A pure tungsten powder and a nano-lanthanum oxide powder are mixed to obtain a mixed powder, and in the mixed powder, the nano-lanthanum oxide powder accounts for 0.5-2% of the mixed powder by mass percent; and then, 3D printing is conducted on the mixed powder to obtain the nano-lanthanum oxide reinforced tungsten-based composite material.

Preferably, the 3D printing is conducted in an argon atmosphere with an oxygen content controlled below 0.5%.

Preferably, the pure tungsten powder is in a spherical shape and has a particle size of 5-25 μm, a purity of 99.9% or above and an oxygen content of less than 100 ppm.

Preferably, the nano-lanthanum oxide powder is in an irregular shape and has a particle size of 50-100 nm and a purity of 99.99% or above.

Another technical solution of the present disclosure is to provide a preparation method of a nano-lanthanum oxide reinforced tungsten-based composite material. The method includes:

step 1: weighing and mixing a pure tungsten powder and a nano-lanthanum oxide powder to obtain a mixed powder, where, the pure tungsten powder accounts for 98-99.5% of the mixed powder by mass percent, and the nano-lanthanum oxide powder accounts for 0.5-2% of the mixed powder by mass percent;

step 2: fully mixing the mixed powder in an argon atmosphere to obtain a fully mixed powder; and step 3: conducting 3D printing by using the fully mixed powder obtained in step 2 as a 3D printing material to obtain the nano-lanthanum oxide reinforced tungsten-based composite material.

Preferably, in step 1, the pure tungsten powder is in a spherical shape and has a particle size of 5-25 μm, a purity of 99.9% or above and an oxygen content of less than 100 ppm.

Preferably, in step 1, the nano-lanthanum oxide powder is in an irregular shape and has a particle size of 50-100 nm and a purity of 99.99% or above.

Preferably, in step 2, fully mixing the mixed powder in an argon atmosphere to obtain a fully mixed powder includes:

putting the mixed powder into a ball mill, introducing argon into the ball mill for protection, conducting mixing for 1.5-3.5 h without milling balls to obtain a fully mixed powder, and sealing and storing the fully mixed powder in a vacuum environment.

Further, in step 2, the ball mill has a motor rotation speed of 900-1,100 r/min, air cooling is conducted for 10 min after mixing is conducted for 30 min, and the mixing is repeated 4 times for a total of 2 h.

Preferably, in step 3, conducting 3D printing by using the fully mixed powder obtained in step 2 as a 3D printing material to obtain the nano-lanthanum oxide reinforced tungsten-based composite material includes:

constructing a three-dimensional model by using CAD software in a computer, and conducting layer slicing and path planning of an energy source by using 3D printing slicing software; and based on the layer slicing and the path planning of an energy source, conducting 3D printing in an argon environment by using the fully mixed powder obtained in step 2 as a 3D printing material to obtain the nano-lanthanum oxide reinforced tungsten-based composite material.

Further, in step 3, based on the layer slicing and the path planning of an energy source, conducting 3D printing in an argon environment by using the fully mixed powder obtained in step 2 as a 3D printing material to obtain the nano-lanthanum oxide reinforced tungsten-based composite material includes:

setting a layer thickness to 25 μm, putting a stainless steel substrate in a forming cavity, putting the fully mixed powder obtained by mixing in step 2 in a powder cylinder, and introducing argon into the closed forming cavity; and based on the layer slicing and the path planning of an energy source, conducting processing layer by layer according to preset process parameters to obtain the nano-lanthanum oxide reinforced tungsten-based composite material, where, the preset process parameters include a set laser power of 250-350 W, a scanning speed of 200-400 mm/s and a scanning spacing of 90-150 μm.

Compared with the prior art, the present disclosure has the following beneficial effects.

In the present disclosure, a tungsten sample with smaller grain size and better mechanical properties is obtained by mixing 0.5-2% of the nano-lanthanum oxide powder under the optimized 3D printing process parameters. It is shown through researches that under the optimized process parameters, lanthanum oxide nanoparticles are introduced into tungsten to serve as an excellent heterogeneous nucleating agent, which can provide a large number of nucleation sites for the tungsten during solidification. In addition, these particles distributed in a melt can inhibit grain growth, and a grain refinement effect is achieved. When a grain is finer, more dispersed plastic deformation of the grain under the action of an external force is achieved, and stress concentration is reduced. When a grain is finer, a grain boundary area is larger, a grain boundary is more tortuous, and crack growth is not facilitated. In addition, the lanthanum oxide as a second phase in the tungsten has a dispersion strengthening effect. During plastic deformation, a dislocation line is bent around the second-phase particles under the action of an external force to form a dislocation loop around the second-phase particles after dislocation. The lattice distortion energy around the dislocation loop is increased, the resistance of the dislocation line is increased, and the deformation resistance is improved.

DETAILED DESCRIPTION OF THE EMBODIMENTS

Some examples listed below are intended only to better illustrate the present disclosure, but contents of the present disclosure are not limited to application of the listed examples. Therefore, nonessential modifications and adjustments of embodiments made by those skilled in the art based on the above contents of the present disclosure still fall within the protection scope of the present disclosure when applied to other examples.

It should be noted that experimental methods without specific conditions in the following examples should be used in accordance with conventional conditions or conditions suggested by manufacturers.

Example 1

In this example, a preparation method of a lanthanum oxide reinforced tungsten-based composite material was provided. The method included the following steps:

step 1: a pure tungsten powder (with a particle size of 5-25 μm) and a nano-lanthanum oxide powder (with a particle size of 50-100 nm) were weighed and mixed to obtain a mixed powder, where, the pure tungsten powder accounted for 99.5% of the mixed powder by mass percent, and the nano-lanthanum oxide powder accounted for 0.5% of the mixed powder by mass percent;

step 2: the mixed powder was put into a ball mill for full mixing for 2 h to obtain a W-0.5% $La_2O_3$ powder, and the powder was sealed and stored in a vacuum environment, where, argon was introduced into the ball mill for protection to prevent oxidation of the powder during the mixing, and milling balls were not added during the mixing to protect the sphericity of the tungsten powder;

step 3: a three-dimensional model was conducted by using CAD software in a computer, and slice layering and planning of a laser path were conducted by using 3D printing slicing software; a layer thickness was set to 25 μm; a stainless steel substrate was put in a forming cavity, the powder obtained by mixing in step 2 was put in a powder cylinder, and argon was introduced into the closed forming cavity; processing was conducted layer by layer according to process parameters set in software, where, a set laser power was 300 W, a laser scanning speed was 200 mm/s, and a laser scanning spacing was 150 μm; and processing was conducted until a set layer number was achieved to obtain a sample; and step 4: the sample obtained by laser 3D printing was ground and polished, observed with an optical microscope to obtain internal defects, etched with an etching agent and then observed with an optical microscope to obtain microscopic structures.

Figure 1:
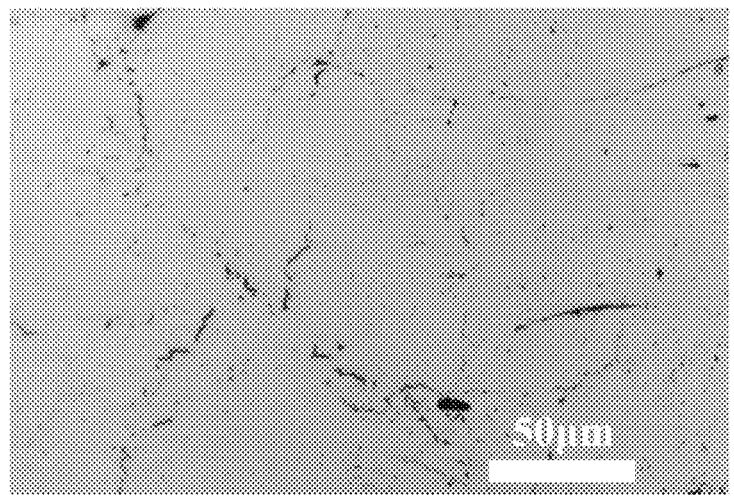
FIG. 1 is a diagram showing internal defects of a W-0.5% $La_2O_3$ composite material sample obtained by laser 3D printing in Example 1 of the present disclosure and observed with an optical microscope.

FIG. 1 was a diagram showing the internal defects of the W-0.5% $La_2O_3$ composite material sample obtained by laser 3D printing in this example and observed with an optical microscope. It could be seen that the sample had few internal defects including only few short and narrow cracks and a small amount of pores.

Figure 2:
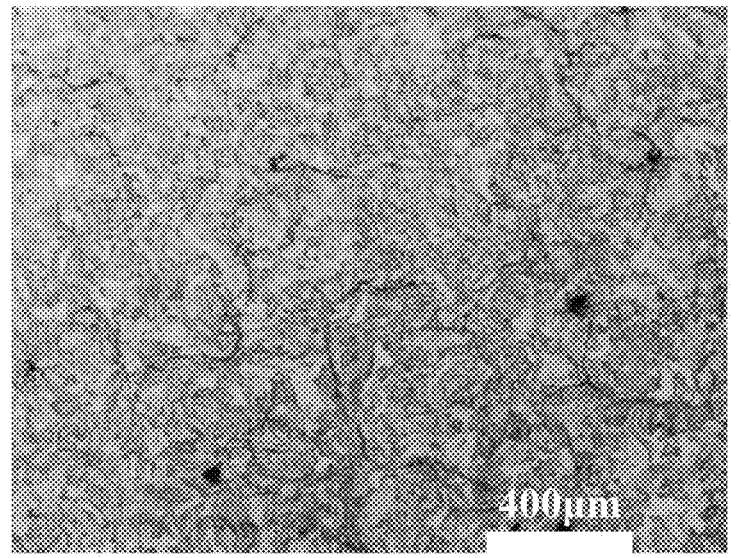
FIG. 2 is a diagram showing microscopic structures of the W-0.5% $La_2O_3$ composite material sample obtained by laser 3D printing in Example 1 of the present disclosure and observed with an optical microscope.

FIG. 2 was a diagram showing the microscopic structures of the W-0.5% $La_2O_3$ composite material sample obtained by laser 3D printing in this example and observed with an optical microscope. It could be seen that whole tungsten grains had relatively small size and relatively uniform size distribution.

Example 2

In this example, a 3D printing preparation method of a lanthanum oxide reinforced tungsten-based composite material was provided. The method included the following steps:

step 1: a pure tungsten powder (with a particle size of 5-25 μm) and a nano-lanthanum oxide powder (with a particle size of 50-100 nm) were weighed and mixed to obtain a mixed powder, where, the pure tungsten powder accounted for 99% of the mixed powder by mass percent, and the nano-lanthanum oxide powder accounted for 1% of the mixed powder by mass percent;

step 2: the mixed powder was put into a ball mill for full mixing for 2 h to obtain a W-1% $La_2O_3$ powder, and the powder was sealed and stored in a vacuum environment, where, argon was introduced into the ball mill for protection to prevent oxidation of the powder during the mixing, and milling balls were not added during the mixing to protect the sphericity of the tungsten powder;

step 3: a three-dimensional model was conducted by using CAD software in a computer, and slice layering and planning of a laser path were conducted by using 3D printing slicing software; a layer thickness was set to 25 μm; a stainless steel substrate was put in a forming cavity, the powder obtained by mixing in step 2 was put in a powder cylinder, and argon was introduced into the closed forming cavity; processing was conducted layer by layer according to process parameters set in software, where, a set laser power was 300 W, a laser scanning speed was 200 mm/s, and a laser scanning spacing was 150 μm; and processing was conducted until a set layer number was achieved to obtain a sample; and step 4: the sample obtained by laser 3D printing was ground and polished, observed with an optical microscope to obtain internal defects, etched with an etching agent and then observed with an optical microscope to obtain microscopic structures.

Figure 3:
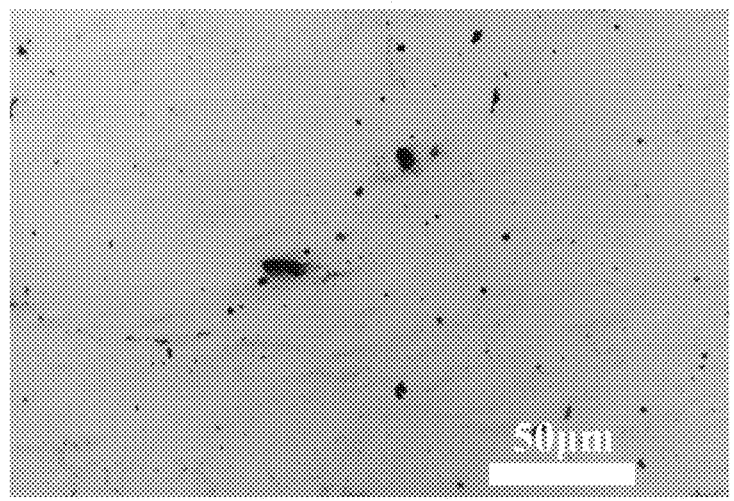
FIG. 3 is a diagram showing internal defects of a W-1% $La_2O_3$ composite material sample obtained by laser 3D printing in Example 2 of the present disclosure and observed with an optical microscope.

FIG. 3 was a diagram showing the internal defects of the W-1% $La_2O_3$ composite material sample obtained by laser 3D printing in this example and observed with an optical microscope. It could be seen that the sample had few internal defects including only few short and narrow cracks and a small amount of pores.

Figure 4:
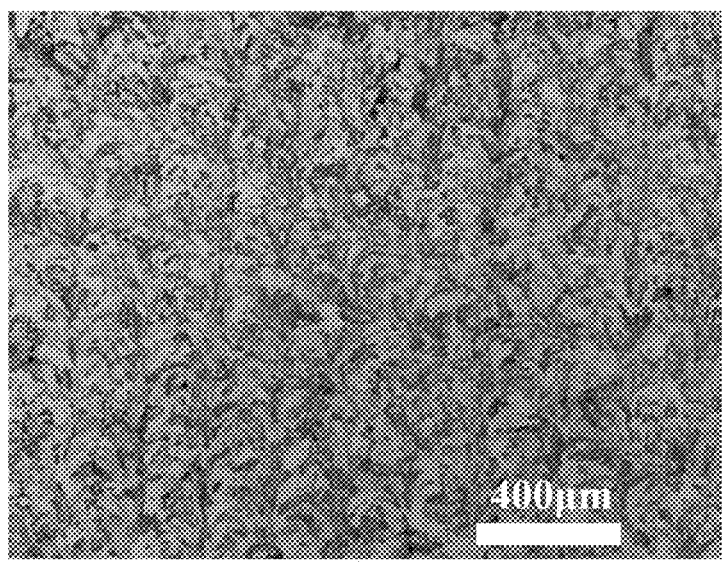
FIG. 4 is a diagram showing microscopic structures of the W-1% $La_2O_3$ composite material sample obtained by laser 3D printing in Example 2 of the present disclosure and observed with an optical microscope.

FIG. 4 was a diagram showing the microscopic structures of the W-1% $La_2O_3$ composite material sample obtained by laser 3D printing in this example and observed with an optical microscope. It could be seen that whole tungsten grains had relatively small size and relatively uniform size distribution.

Example 3

In this example, a laser 3D printing preparation method of a lanthanum oxide reinforced tungsten-based composite material was provided. The method included the following steps:

step 1: a pure tungsten powder (with a particle size of 5-25 μm) and a nano-lanthanum oxide powder (with a particle size of 50-100 nm) were weighed and mixed to obtain a mixed powder, where, the pure tungsten powder accounted for 98% of the mixed powder by mass percent, and the nano-lanthanum oxide powder accounted for 2% of the mixed powder by mass percent;

step 2: the mixed powder was put into a ball mill for full mixing for 2 h to obtain a W-2% $La_2O_3$ powder, and the powder was sealed and stored in a vacuum environment, where, argon was introduced into the ball mill for protection to prevent oxidation of the powder during the mixing, and milling balls were not added during the mixing to protect the sphericity of the tungsten powder;

step 3: a three-dimensional model was conducted by using CAD software in a computer, and slice layering and planning of a laser path were conducted by using 3D printing slicing software; a layer thickness was set to 25 μm; a stainless steel substrate was put in a forming cavity, the powder obtained by mixing in step 2 was put in a powder cylinder, and argon was introduced into the closed forming cavity; processing was conducted layer by layer according to process parameters set in software, where, a set laser power was 300 W, a laser scanning speed was 200 mm/s, and a laser scanning spacing was 150 μm; and processing was conducted until a set layer number was achieved to obtain a sample; and step 4: the sample obtained by laser 3D printing was ground and polished, observed with an optical microscope to obtain internal defects, etched with an etching agent and then observed with an optical microscope to obtain microscopic structures.

Figure 5:
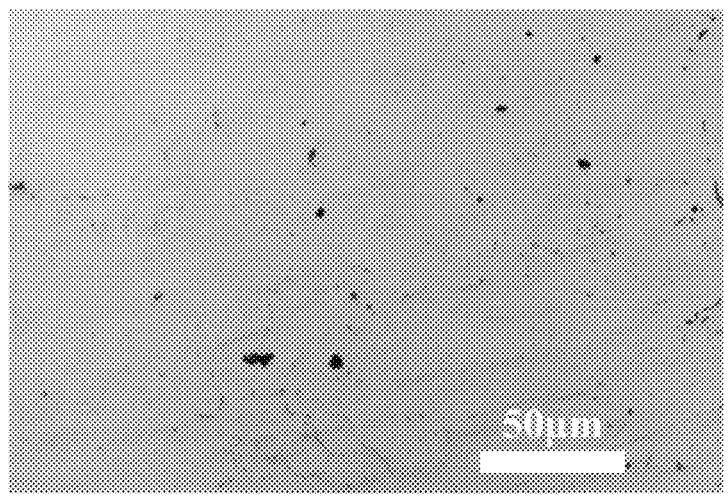
FIG. 5 is a diagram showing internal defects of a W-2% $La_2O_3$ composite material sample obtained by laser 3D printing in Example 3 of the present disclosure and observed with an optical microscope.

FIG. 5 was a diagram showing the internal defects of the W-2% $La_2O_3$ composite material sample obtained by laser 3D printing in this example and observed with an optical microscope. It could be seen that the sample had few internal defects including only few short and narrow cracks and a small amount of pores.

Figure 6:
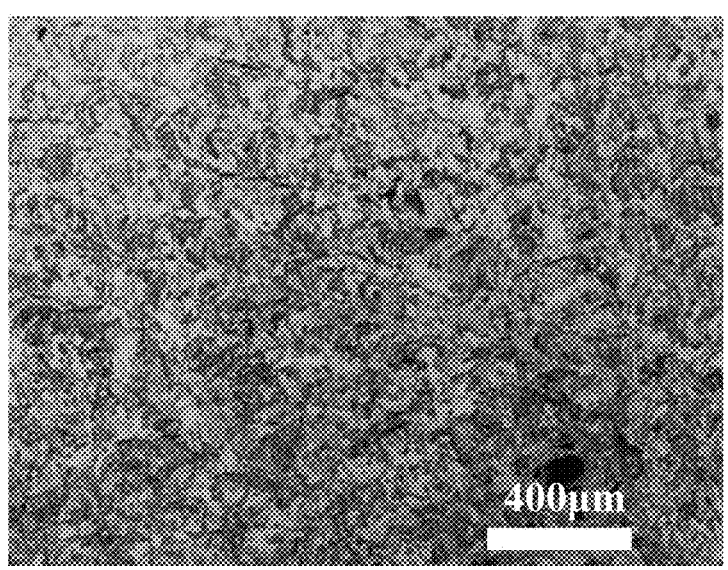
FIG. 6 is a diagram showing microscopic structures of the W-2% $La_2O_3$ composite material sample obtained by laser 3D printing in Example 3 of the present disclosure and observed with an optical microscope.

FIG. 6 was a diagram showing the microscopic structures of the W-2% $La_2O_3$ composite material sample obtained by laser 3D printing in this example and observed with an optical microscope. It could be seen that whole tungsten grains had relatively small size and relatively uniform size distribution.

Comparative Example

In this example, a laser 3D printing preparation method of pure tungsten was provided. The method included the following steps:

a three-dimensional model was conducted by using CAD software in a computer, and slice layering and planning of a laser path were conducted by using 3D printing slicing software; a layer thickness was set to 25 μm; a stainless steel substrate was put in a forming cavity, a pure tungsten powder (with a particle size of 5-25 μm) was put in a powder cylinder, and argon was introduced into the closed forming cavity; processing was conducted layer by layer according to process parameters set in software, where, a set laser power was 300 W, a laser scanning speed was 200 mm/s, and a laser scanning spacing was 150 μm; and processing was conducted until a set layer number was achieved to obtain a sample; and step 4: the sample obtained by laser 3D printing was ground and polished, observed with an optical microscope to obtain internal defects, etched with an etching agent and then observed with an optical microscope to obtain microscopic structures.

Figure 7:
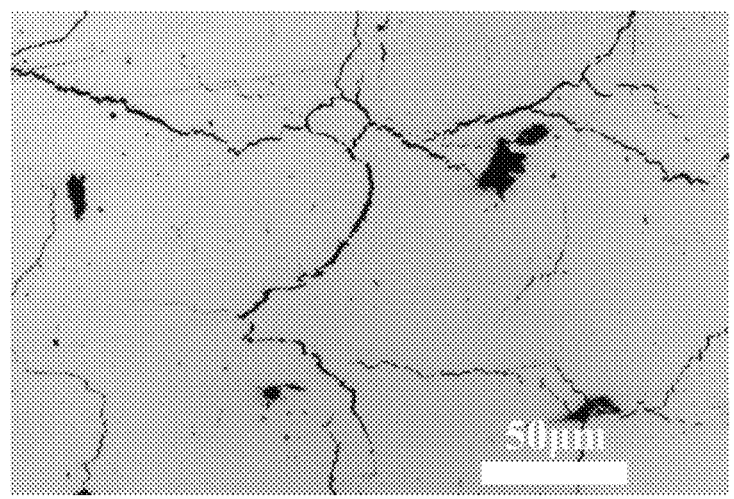
FIG. 7 is a diagram showing internal defects of a pure tungsten sample obtained by laser 3D printing in a comparative example of the present disclosure and observed with an optical microscope.

FIG. 7 was a diagram showing the internal defects of the pure tungsten sample obtained by laser 3D printing in this example and observed with an optical microscope. It could be seen that the sample had many internal defects including a large number of long and wide cracks and large pores.

Figure 8:
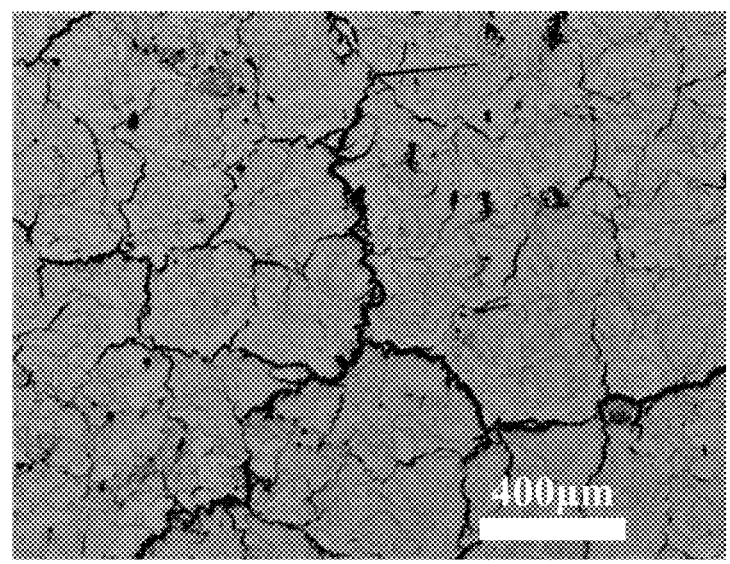
FIG. 8 is a diagram showing microscopic structures of the pure tungsten sample obtained by laser 3D printing in the comparative example of the present disclosure and observed with an optical microscope.

FIG. 8 was a diagram showing the microscopic structures of the pure tungsten sample obtained by laser 3D printing in this example and observed with an optical microscope. It could be seen that whole tungsten grains had relatively large size and nonuniform size distribution.

Figure 9:
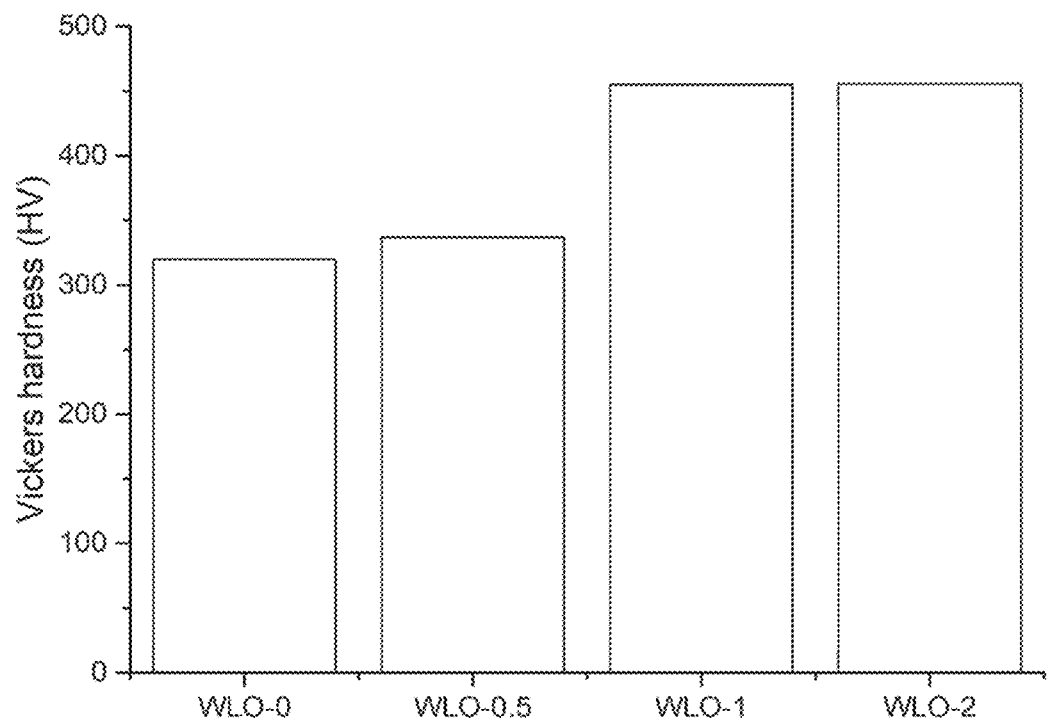
FIG. 9 is a comparison diagram showing microhardness tests of the samples prepared in Example 1, Example 2, Example 3 and the comparative example.

FIG. 9 was a comparison diagram showing microhardness tests of the samples prepared in Example 1, Example 2, Example 3 and the comparative example. It could be seen that the sample of the present disclosure had higher microhardness.

Figure 10:
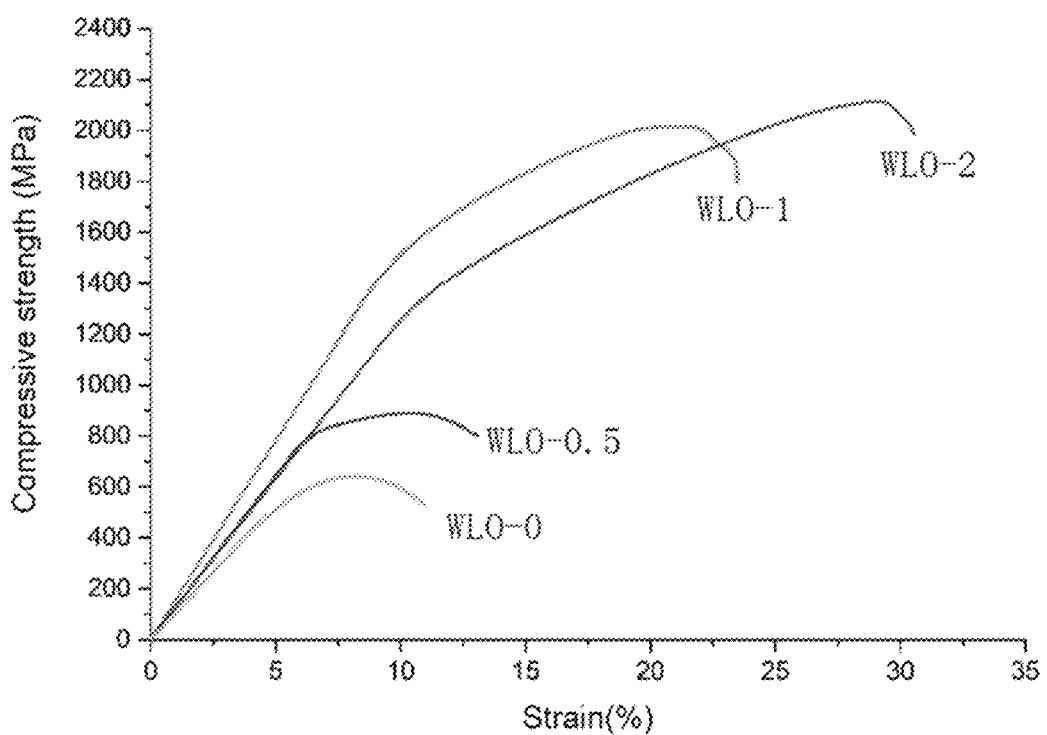
FIG. 10 is a comparison diagram showing compression curves of the samples prepared in Example 1, Example 2, Example 3 and the comparative example.

FIG. 10 was a comparison diagram showing compression curves of the samples prepared in Example 1, Example 2, Example 3 and the comparative example. It could be seen that the sample of the present disclosure had higher compressive strength.

By combining the examples above, a sample with fewer defects, fine and uniform microscopic structures and better mechanical properties is obtained by laser 3D printing in the present disclosure.

The examples of the present disclosure are described above with reference to the accompanying drawings, and a lanthanum oxide doped tungsten printed part with significantly reduced cracks is obtained. From the examples above, it can be seen that different final results are achieved when different materials are used in a production process. Better effects of the tungsten-based printed part may be achieved by those of ordinary skill in the art by improving the relevant process parameters and using different materials under the inspiration of the present disclosure, and all these effects fall within the protection scope of the present disclosure.

What is claimed is:

1. A preparation method of a nano-lanthanum oxide reinforced tungsten- based composite material, comprising:
   step 1: weighing and mixing a pure tungsten powder and a nano-lanthanum oxide powder to obtain a mixed powder, wherein, the pure tungsten powder accounts for 98-99.5% of the mixed powder by mass percent, and the nano-lanthanum oxide powder accounts for 0.5-2% of the mixed powder by mass percent;
   step 2: fully mixing the mixed powder in an argon atmosphere to obtain a fully mixed powder; and
   step 3: conducting 3D printing by using the fully mixed powder obtained in step 2 as a 3D printing material to obtain the nano-lanthanum oxide reinforced tungsten-based composite material.

2. The preparation method according to claim 1, wherein, in step 1, the pure tungsten powder has a particle size of 5-25 μm.

3. The preparation method according to claim 1, wherein, in step 1, the nano-lanthanum oxide powder has a particle size of 50-100 nm.

4. The preparation method according to claim 1, wherein, in step 2, the step of fully mixing the mixed powder in an argon atmosphere to obtain a fully mixed powder comprises:
   putting the mixed powder into a ball mill, introducing argon into the ball mill for protection, conducting mixing for 1.5-3.5 h without milling balls to obtain a fully mixed powder, and sealing and storing the fully mixed powder in a vacuum environment.

5. The preparation method according to claim 4, wherein, in step 2, the ball mill has a motor rotation speed of 900-1,100 r/min, air cooling is conducted for 10 min after mixing is conducted for 30 min, and the mixing is repeated 4 times for a total of 2 h.

6. The preparation method according to claim 1, wherein, in step 3, conducting 3D printing by using the fully mixed powder obtained in step 2 as a 3D printing material to obtain the nano-lanthanum oxide reinforced tungsten-based composite material comprises:
   constructing a three-dimensional model by using CAD software in a computer, and conducting slice layering and path planning of an energy source; and
   based on the slice layering and the path planning of an energy source, conducting 3D printing in an argon environment by using the fully mixed powder obtained in step 2 as a 3D printing material to obtain the nano-lanthanum oxide reinforced tungsten-based composite material.

7. The preparation method according to claim 6, wherein, in step 3, based on the slice layering and the path planning of an energy source, conducting 3D printing in an argon environment by using the fully mixed powder obtained in step 2 as a 3D printing material to obtain the nano-lanthanum oxide reinforced tungsten-based composite material comprises:
   setting a layer thickness to 25 μm, putting a stainless steel substrate in a forming cavity, putting the fully mixed powder obtained by mixing in step 2 in a powder cylinder, and introducing argon into the closed forming cavity; and
   based on the slice layering and the path planning of an energy source, conducting processing layer by layer according to preset process parameters to obtain the nano-lanthanum oxide reinforced tungsten-based composite material, wherein, the preset process parameters comprise a set laser power of 250-350 W, a scanning speed of 200-400 mm/s and a scanning spacing of 90-150 μm.

* * * * *